No. 821,695. PATENTED MAY 29, 1906.
H. J. BAKER.
LOCK NUT.
APPLICATION FILED JAN. 22, 1906.
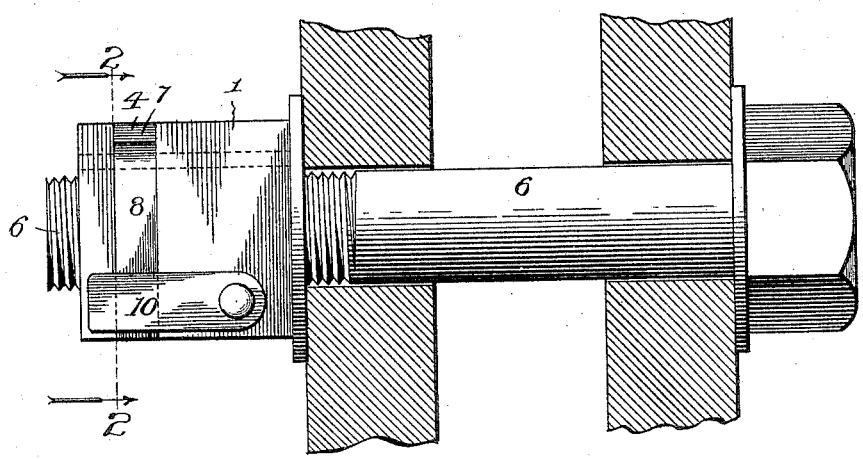
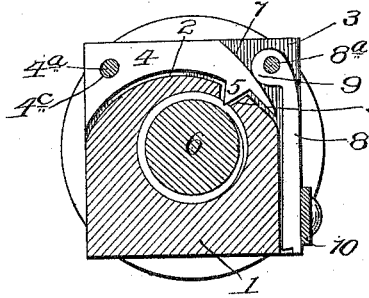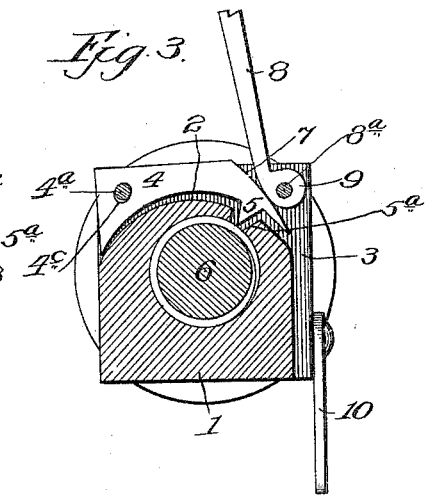
Witnesses:
Alfred H. Moore.
G. E. Folk
Inventor.
Henry J. Baker,
By Barton & Banner
Attys.

UNITED STATES PATENT OFFICE.

HENRY J. BAKER, OF CHICAGO, ILLINOIS.

LOCK-NUT.

No. 821,695.  Specification of Letters Patent.  Patented May 29, 1906.

Application filed January 22, 1906. Serial No. 297,175.

*To all whom it may concern:*

Be it known that I, HENRY J. BAKER, a citizen of the United States, residing at Chicago, in the county of Cook and State of Illinois, have invented a certain new and useful Improvement in Lock-Nuts, of which the following is a full, clear, concise, and exact description.

My invention relates to nut-locks; and its object is to provide simple and efficient means for holding a nut securely fixed upon a bolt, so that said nut cannot accidentally work off.

A nut and bolt of my invention are adapted for any of the ordinary uses to which said devices are placed.

My invention is especially applicable, however, for use on railway-cars, for holding rails in place, and in other similar positions in which the bolt is subjected to a jarring action likely to cause the nut to unscrew or work off the bolt, and thereby permit the loosening of the parts secured by the bolt.

My invention contemplates a device in which a dog mounted upon the nut is adapted to be pressed by a cam-lever into locking engagement with the bolt. In order that said dog and lever may be in a protected position, I preferably mount said parts in a channel or groove in the face of the nut.

My invention may be more readily understood by reference to the accompanying drawings, in which—

Figure 1 is a side elevation of a nut equipped with my invention and showing the same in an operative position on a bolt. Figs. 2 and 3 are sections on the line 2 2 of Fig. 1, showing the bolt in locked and unlocked positions, respectively, upon the bolt.

In the preferred construction illustrated in the drawings the nut 1 is provided with grooves or channels 2 3 upon two of its adjacent faces, said channels communicating with each other. The channel 2 has a convex bottom conforming to the concave under surface of a dog 4, pivoted in the channel 2 near one edge of the nut. Said dog has a projection 5, provided with a chisel edge adapted to enter an opening 5$^a$ in the nut and to bite into the threads upon the bolt 6. The end of the dog 4 has a beveled surface 7. A lever 8, pivoted at one edge of the nut above the dog 4, has a cam-surface 9 at its pivoted end adapted when the lever is depressed to bear upon the beveled end of the dog 4 and press the projection 5 of the dog into locking engagement with the bolt. Said dog and lever are secured to the nut by rivets 4$^a$ and 8$^a$, respectively, running through the nut. In the locked position of the parts both the dog 4 and the lever 8 lie in their respective channels substantially flush with the surface of the nut. A pivoted latch 10 is provided for holding the lever 8 in the groove 3. As is apparent, when the parts are in the positions shown in Fig. 2 the nut is immovably held upon the bolt 6 and cannot be loosened until the lever 8 is thrown back and the dog 4 released thereby. The hole 4$^c$ in the dog, through which the pivot 4$^a$ passes, is preferably oval-shaped in order that the weight of the end of the dog may automatically throw said dog out of engagement with the bolt, when the pressure of the cam thereon is withdrawn.

Having thus described my invention, I claim—

1. The combination with a bolt, of a nut therefor having an opening extending through one of its side walls to said bolt, a dog pivotally mounted on said side wall near one edge of the same, the free end of the dog extending approximately to the next adjacent edge, a projection on said dog adapted to enter said opening, a lever pivoted above the free end of the dog, said lever having a cam-surface adapted to bear upon the free end of said dog to press said projection into engagement with the bolt.

2. The combination with a bolt, of a nut therefor having an opening extending from the face of the nut to the bolt, a dog pivoted upon the nut the free end of the dog being beveled, a projection on said dog beneath said beveled end adapted to enter said opening and engage the bolt, a lever pivoted above the free end of the dog, and a cam upon said lever adapted upon the depression of the lever to bear upon the beveled end of said dog and thereby to bring said projection into locking engagement with the bolt.

3. The combination with a threaded bolt, of a nut therefor having a channel in its face and an opening extending from said channel to the threads of the bolt, a dog pivoted in the channel, the free end of the dog being beveled, a projection on said dog having a chisel edge adapted to enter said opening and to bite into the threads of the bolt, a lever pivoted in said channel, a cam upon said lever adapted upon the depression of the lever to bear upon the beveled end of said dog and thereby to press said chisel edge into engagement with the threads of the bolt, and means for holding said lever in its depressed position.

4. The combination with a threaded bolt, of a nut therefor having communicating channels in two of its adjacent faces and an opening extending from one of said channels to the threads of the bolt, a dog pivotally mounted in said latter channel, the free end of the dog being beveled, a projection on said dog having a chisel edge adapted to enter said opening, a lever pivoted at the edge of the nut above the beveled end of the dog and adapted to lie in the other of said channels, said lever having a cam-surface adapted to bear upon the beveled end of said dog when the lever is depressed into the groove, and thereby to press said dog into engagement with the threads of the bolt, and a latch for holding said lever locked in the groove.

5. The combination with a threaded bolt, of a nut therefor having communicating channels in two of its adjacent faces, and an opening extending from a point near the junction of said channels to the threads of the bolt, a dog pivotally mounted at one edge of the nut and adapted to lie in one of said channels, said dog being beveled at its free end with a chisel-edged projection on its under side adapted to enter said opening, a lever pivoted at the edge of the nut above the end of the dog and adapted to lie in the other of said channels, said lever having a cam upon its pivoted end adapted to bear upon the beveled end of said dog and force the same into locking engagement with the bolt, and a latch for holding said lever in its locking position.

In witness whereof I hereunto subscribe my name this 19th day of January, A. D. 1906.

HENRY J. BAKER.

Witnesses:
GEORGE E. FOLK,
ALFRED H. MOORE.